United States Patent [19]
Gannon

[11] Patent Number: 6,144,905
[45] Date of Patent: Nov. 7, 2000

[54] METHOD FOR REGISTERING VEHICULAR BUS FUNCTIONALITY

[75] Inventor: Mark A. Gannon, Sleepy Hollow, Ill.

[73] Assignee: Motorola, Inc., Schaumburg, Ill.

[21] Appl. No.: 09/040,571

[22] Filed: Mar. 18, 1998

[51] Int. Cl.[7] .................................................. G06F 7/00
[52] U.S. Cl. ..................... 701/36; 701/1; 701/2; 370/401
[58] Field of Search .................. 701/1, 29, 32, 701/33, 36, 48, 54, 70, 2; 370/245, 401

[56] References Cited

U.S. PATENT DOCUMENTS

| | | | |
|---|---|---|---|
| 5,091,856 | 2/1992 | Hasegawa et al. | 701/36 |
| 5,351,776 | 10/1994 | Keller et al. | 701/70 |
| 5,369,584 | 11/1994 | Kajiwara et al. | 701/48 |
| 5,510,775 | 4/1996 | Loncle | 340/825.07 |

*Primary Examiner*—William A. Cuchlinski, Jr.
*Assistant Examiner*—Gertrude Arthur
*Attorney, Agent, or Firm*—Wayne J. Egan; Nicholas C. Hopman; John J. King

[57] ABSTRACT

A vehicle (100) has a plurality of vehicle systems (11, 12, 13) and a plurality of user devices (40, 50, 60), each vehicle system including a unique function. The vehicle also has a vehicle bus (10) and a user bus (30), the vehicle bus coupled to the plurality of vehicle systems, the user bus coupled to the plurality of user devices, the vehicle bus coupled to the user bus by means of a gateway (20). Each function corresponding to each vehicle system is registered in the gateway. As a result, the user devices can determine and interact with the functionality of the individual vehicular devices.

22 Claims, 1 Drawing Sheet

METHOD FOR REGISTERING VEHICULAR BUS FUNCTIONALITY

TECHNICAL FIELD

This invention relates general to telematics and, in particular, to a method for registering vehicular bus functionality.

BACKGROUND AND SUMMARY OF THE INVENTION

It is known for a vehicle, such as a car, to have both a vehicle bus and a user bus. As known, typically the vehicle bus supports the various vehicle systems, such as an engine, instrument display, door locks, flashing lights, etc. Also, typically the user bus supports various user devices, such as a cell phone, a radio frequency ("RF") data device, a pager, a global positioning satellite ("GPS") receiver, etc.

As known, the vehicular bus contains various proprietary information and safety-related information such as, for example, an anti-theft system computer program or an anti-lock braking system computer program. As a result, generally the user bus is not directly coupled to the vehicular bus; instead, the user bus is coupled to the vehicular bus by means of a gateway.

With the recent trend of providing user devices with increased functionality, it is desirable that the user bus be provided with some means to communicate with the vehicular bus. Further, in order to support increasingly enhanced user applications, it is necessary to provide the user devices with a method to interact with the functionality of the individual vehicular devices.

As a result, it would be desirable to enable the user devices to obtain the functionality of the vehicle devices by means of the aforementioned gateway. As a result, there is a need for a method for registering the functionality of the vehicular devices on the vehicular bus with the gateway.

DETAILED DESCRIPTION OF THE PREFERRED EMBODIMENTS

Figure 1:
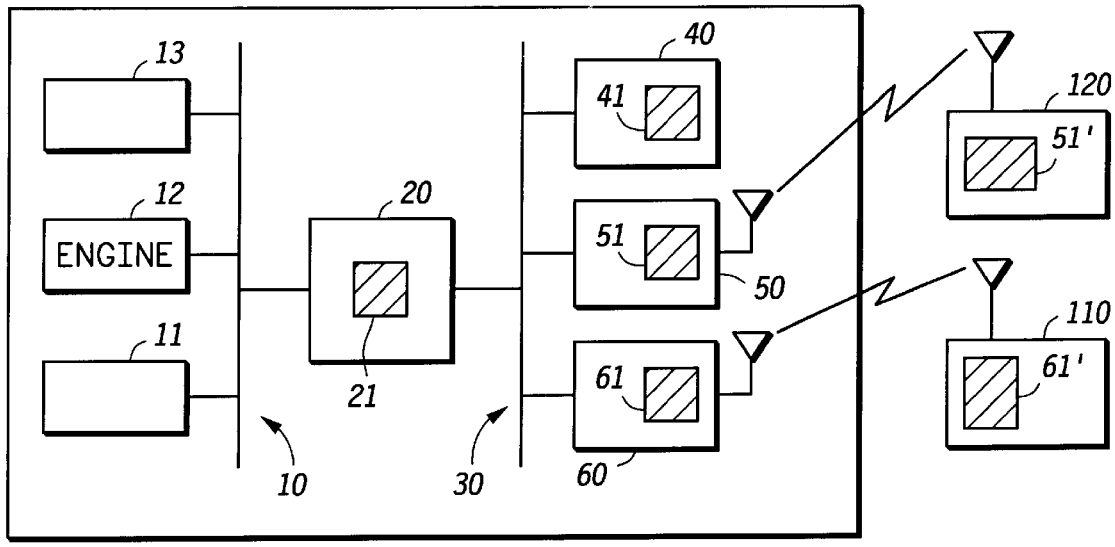
FIG. 1 shows a vehicle arranged with a gateway system registration, in accordance with the present invention.

Referring now to FIG. 1, there is shown a vehicle 100 having a vehicle bus 10 and a user bus 30, the vehicle bus and the user bus being coupled to a gateway 20. As shown, the vehicle bus supports and is coupled to a plurality of vehicle systems 11, 12, 13. Also, the user bus supports and is coupled to a plurality of user devices 40, 50, 60. Each of the plurality of vehicle systems including a unique function; for example, vehicle system 12 is an engine. As well, each of the plurality of user devices supports a unique function. For example, user device 50 comprises a first RF data device arranged to communicate with a first remote device 110, the first remote device 110 being located separately from the vehicle 100. As well, user device 60 comprises a second RF data device arranged to communicate with a second remote device 120, the second remote device 120 being located separately from the vehicle 100.

As shown, the vehicle bus 10 is coupled to the user bus 30 by means of the gateway 20.

Figure 2:
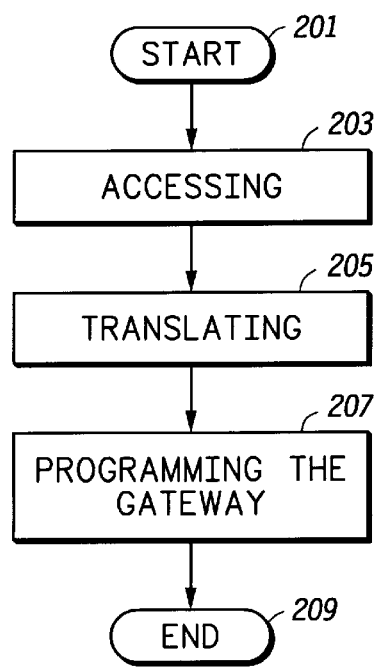
FIG. 2 is a flow diagram for a first embodiment of the present invention.

In accordance with a first embodiment of the present invention, the function corresponding to each vehicle system 11, 12, 13 is registered in the gateway 20 by programming the gateway with a vehicle system format, the vehicle system format including the functionality corresponding to the plurality of vehicle systems, thus forming a gateway vehicle system registration. Referring now to FIG. 2, the process starts, step 201, and then proceeds to step 203, where a list of vehicle systems provided with the vehicle is accessed.

The process next goes to step 205, where the list of vehicle systems provided with the vehicle is translated into a format used by the gateway, the format including the functionality corresponding to the list of vehicle systems.

The process next goes to step 207, where the gateway is programmed by forming a gateway vehicle system registration in the gateway. With reference to FIG. 1, the gateway vehicle system registration is depicted by reference number 21. Referring back to FIG. 2, it will be understood that, if the information depicted in process steps 203 and 205 is known, the process can go immediately from start to step 207.

Figure 3:
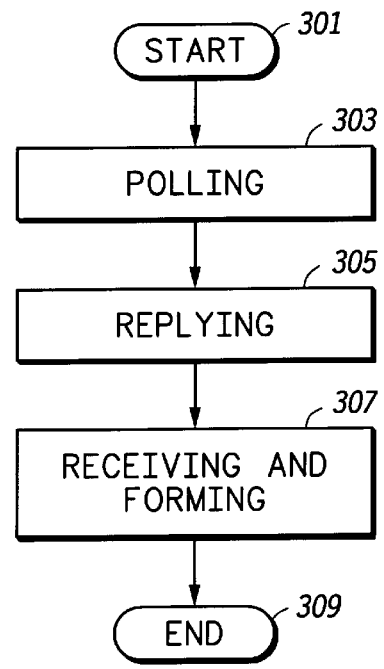
FIG. 3 is a flow diagram for a second embodiment of the present invention.

In accordance with a second embodiment of the present invention, the function corresponding to each vehicle system 11, 12, 13 is registered in the gateway 20 by programming the gateway by a polling process as depicted in FIG. 3. Referring now to FIG. 3, the process starts, step 301, and then proceeds to step 303, where the gateway 20 polls each of the plurality of vehicle systems.

The process next goes to step 305 where each vehicle system, in reply to the polling as in step 303, provides the gateway with its corresponding functionality.

The process next goes to step 307, where, upon receiving the plurality of replies from the plurality of vehicle systems as in step 305, and based on the plurality of replies, the gateway 30 forms and stores a vehicle system format including the functionality corresponding to the plurality of vehicle systems, thus forming a gateway vehicle system registration.

In summary, whether by the process of FIG. 2 or the process of FIG. 3, a gateway vehicle system registration 21 is formed in gateway 20.

In one embodiment, the gateway 20 includes a non-volatile memory, and the programming step 207 includes a step of storing the gateway vehicle system registration in the non-volatile memory.

In another embodiment, at least one user device, depicted in FIG. 1 as element 60, retrieves a copy of the gateway vehicle system registration, depicted as element 61, and transmits the copy of the gateway vehicle system registration by means of RF communication to a remote device, the remote device depicted as element 110, the transmitted copy depicted as element 61'. Thereafter, the remote device 110 bases its future functions at least in part on the copy of the gateway vehicle system registration 61'.

In another embodiment, at least one of the user devices, depicted in FIG. 1 as element 50, retrieves and stores a copy of the gateway vehicle system registration, thus forming a device vehicle system registration, depicted in FIG. 1 as element 51. Thereafter, the user device 50 bases its future functions at least in part on the device vehicle system registration 51. Also, the user device 50 transmits a copy of the device vehicle system registration, depicted as reference number 51', to the remote device 120 by means of RF communication, the remote device located separately from the vehicle. Thereafter, the remote device 120 bases its future functions at least in part on the copy 51' of the device vehicle system registration.

In another embodiment, at least one user device, depicted in FIG. 1 as element 40, accesses the gateway vehicle system registration, thus forming accessed gateway vehicle system registration information, depicted in FIG. 1 as element 41. Thereafter, the user device 40 bases its future functions at least in part on the accessed gateway vehicle system registration information.

I claim:

1. In a vehicle having a plurality of vehicle systems and a plurality of user devices, each of the plurality of vehicle systems including a unique function, and having a vehicle bus and a user bus, the vehicle bus coupled to the plurality of vehicle systems, the user bus coupled to the plurality of user devices, the vehicle bus coupled to the user bus by means of a gateway, a method for registering in the gateway each function corresponding to each vehicle system, including steps of:

programming the gateway with a vehicle system format, the vehicle system format including the functionality corresponding to the plurality of vehicle systems, thus forming a gateway vehicle system registration; and retrieving, by at least one user device, a copy of the gateway vehicle system registration and transmitting the copy of the gateway vehicle system registration by means of RF communication to a remote device, the remote device located separately from the vehicle.

2. The method of claim 1, including a step of accessing the list of vehicle systems provided with the vehicle.

3. The method of claim 2, including a step of translating the list of vehicle systems provided with the vehicle into a format used by the gateway, the format including the functionality corresponding to the list of vehicle systems, thus forming the gateway vehicle system registration.

4. The method of claim 1, the gateway including a non-volatile memory, and the programming step including a step of storing the gateway vehicle system registration in the non-volatile memory.

5. The method of claim 1, including a step, by at least one user device, of retrieving a copy of the gateway vehicle system registration and transmitting the copy of the gateway vehicle system registration by means of RF communication to a remote device, the remote device located separately from the vehicle.

6. The method of claim 1, including a step, by the remote device, of basing its future functions at least in part on the copy of the gateway vehicle system registration.

7. In a vehicle having a plurality of vehicle systems and a plurality of user devices, each of the plurality of vehicle systems including a unique function, and having a vehicle bus and a user bus, the vehicle bus coupled to the plurality of vehicle systems, the user bus coupled to the plurality of user devices, the vehicle bus coupled to the user bus by means of a gateway, a method for registering in the gateway each function corresponding to each vehicle system, including steps of:

programming the gateway with a vehicle system format, the vehicle system format including the functionality corresponding to the plurality of vehicle systems, thus forming a gateway vehicle system registration; and retrieving and storing, by at least one of the user devices, a copy of the gateway vehicle system registration, thus forming a device vehicle system registration.

8. The method of claim 7, including a step, by the at least one user device, of basing its future functions at least in part on the device vehicle system registration.

9. The method of claim 7, including a step, by the at least one user device, of transmitting a copy of the device vehicle system registration to a remote device by means of RF communication, the remote device located separately from the vehicle.

10. The method of claim 9, including a step, by the remote device, of basing its future functions at least in part on the copy of the device vehicle system registration.

11. In a vehicle having a plurality of vehicle systems and a plurality of user devices, each of the plurality of vehicle systems including a unique function, and having a vehicle bus and a user bus, the vehicle bus coupled to the plurality of vehicle systems, the user bus coupled to the plurality of user devices, the vehicle bus coupled to the user bus by means of a gateway, a method for registering in the gateway each function corresponding to each vehicle system, including steps of:

programming the gateway with a vehicle system format, the vehicle system format including the functionality corresponding to the plurality of vehicle systems, thus forming a gateway vehicle system registration; and by at least one user device, of accessing the gateway vehicle system registration, thus forming accessed gateway vehicle system registration information.

12. The method of claim 11, including a step, by the at least one user device, of basing its future functions at least in part on the accessed gateway vehicle system registration information.

13. In a vehicle having a plurality of vehicle systems and a plurality of user devices, each of the plurality of vehicle systems including a unique function, and having a vehicle bus ad a user bus, the vehicle bus coupled to the plurality of vehicle systems, the user bus coupled to the plurality of user devices, the vehicle bus coupled to the user bus by means of a gateway, a method of registering in the gateway each function corresponding to each vehicle system, including a step of:

(a) by the gateway, polling each of the plurality of vehicle systems, (b) by each vehicle system, in reply to the polling as in step (a), providing the gateway with its corresponding functionality, (c) by the gateway, receiving the plurality of replies from the plurality of vehicle systems as in step (b) and, based on the plurality of replies, forming and storing a vehicle system format including the functionality corresponding to the plurality of vehicle systems, thus forming a gateway vehicle system registration; and (d) by at least one user device, of retrieving a copy of the gateway vehicle system registration and transmitting the copy of the gateway vehicle system registration by means of RF communication to a remote device, the remote device located separately from the vehicle.

14. The method of claim 13, the gateway including a non-volatile memory, and the programming step including a step of storing the gateway vehicle system registration in the non-volatile memory.

15. The method of claim 13, including a step, by at least one user device, of retrieving a copy of the gateway vehicle system registration and transmitting the copy of the gateway vehicle system registration by means of RF communication to a remote device, the remote device located separately from the vehicle.

16. The method of claim 13, including a step, by the remote device, of basing its future functions at least in part on the copy of the gateway vehicle system registration.

17. In a vehicle having a plurality of vehicle systems and a plurality of user devices, each of the plurality of vehicle systems including a unique function, and having a vehicle bus ad a user bus, the vehicle bus coupled to the plurality of vehicle systems, the user bus coupled to the plurality of user devices, the vehicle bus coupled to the user bus by means of a gateway, a method of registering in the gateway each function corresponding to each vehicle system, including a step of:

(a) by the gateway, polling each of the plurality of vehicle systems, (b) by each vehicle system, in reply to the polling as in step (a), providing the gateway with its corresponding functionality, (c) by the gateway, receiving the plurality of replies from the plurality of vehicle systems as in step (b) and, based on the plurality of replies, forming and storing a vehicle system format including the functionality corresponding to the plurality of vehicle systems, thus forming a gateway vehicle system registration; and (d) by at least one of the user devices, retrieving and storing a copy of the gateway vehicle system registration, thus forming a device vehicle system registration.

18. The method of claim 17, including a step, by the at least one user device, of basing its future functions at least in part on the device vehicle system registration.

19. The method of claim 17, including a step, by the at least one user device, of transmitting a copy of the device vehicle system registration to a remote device by means of RF communication, the remote device located separately from the vehicle.

20. The method of claim 19, including a step, by the remote device, of basing its future functions at least in part on the copy of the device vehicle system registration.

21. In a vehicle having a plurality of vehicle systems and a plurality of user devices, each of the plurality of vehicle systems including a unique function, and having a vehicle bus ad a user bus, the vehicle bus coupled to the plurality of vehicle systems, the user bus coupled to the plurality of user devices, the vehicle bus coupled to the user bus by means of a gateway, a method of registering in the gateway each function corresponding to each vehicle system, including a step of:

(a) by the gateway, polling each of the plurality of vehicle systems, (b) by each vehicle system, in reply to the polling as in step (a), providing the gateway with its corresponding functionality, (b) by the gateway, receiving the plurality of replies from the plurality of vehicle systems as in step (b) and, based on the plurality of replies, forming and storing a vehicle system format including the functionality corresponding to the plurality of vehicle systems, thus forming a gateway vehicle system registration; and (d) by at least one user device, of accessing the gateway vehicle system registration, thus forming accessed gateway vehicle system registration information.

22. The method of claim 21, including a step, by the at least one user device, of basing its future functions at least in part on the accessed gateway vehicle system registration information.

* * * * *